United States Patent [19]

Sisk et al.

[11] 4,191,023
[45] Mar. 4, 1980

[54] FUEL FIRED SUPPLEMENTARY HEATER FOR HEAT PUMP

[75] Inventors: Francis J. Sisk, Apollo; Stephen E. Veyo, Murrysville, both of Pa.

[73] Assignee: Electric Power Research Institute, Inc., Palo Alto, Calif.

[21] Appl. No.: 918,736

[22] Filed: Jun. 23, 1978

Related U.S. Application Data

[62] Division of Ser. No. 769,830, Feb. 18, 1977, Pat. No. 4,112,705.

[51] Int. Cl.$^2$ .............. F25B 7/00; F25B 27/02; F25B 13/00; F25B 29/00
[52] U.S. Cl. ........................... 62/79; 62/238; 62/324; 165/29
[58] Field of Search ............ 62/324 D, 238 E, 79; 165/29

[56] References Cited

U.S. PATENT DOCUMENTS

| | | | |
|---|---|---|---|
| 3,777,508 | 12/1973 | Imabayashi et al. | 165/29 |
| 4,055,963 | 11/1977 | Shoji et al. | 62/238 E |

Primary Examiner—Lloyd L. King
Attorney, Agent, or Firm—Townsend and Townsend

[57] ABSTRACT

A heat pump is disclosed which has a compressor, an indoor condenser (for winter heating), outdoor evaporator (for winter heating) and piping for flowing a refrigerant between the compressor, the condenser and the evaporator. A second refrigerant loop is formed which bypasses the compressor and communicates with the condenser outlet and intake. A liquid metering pump flows liquid refrigerant from the outlet of the condenser via a fuel, e.g. liquid petroleum gas fired refrigerant vaporizer back to the condenser intake so that auxiliary heat from the burner for heating an indoor space by feeding to the condenser heated refrigerant vapor in addition to the refrigerant vapor supplied to the condenser by the compressor.

4 Claims, 2 Drawing Figures

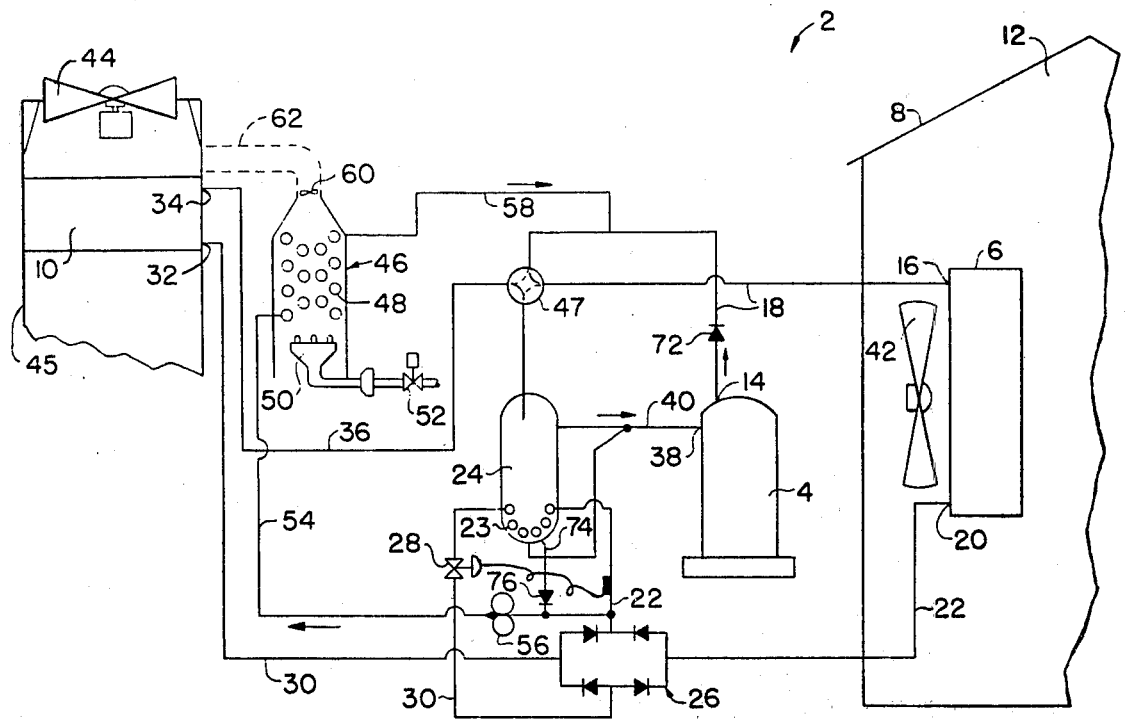
FIG.—1.
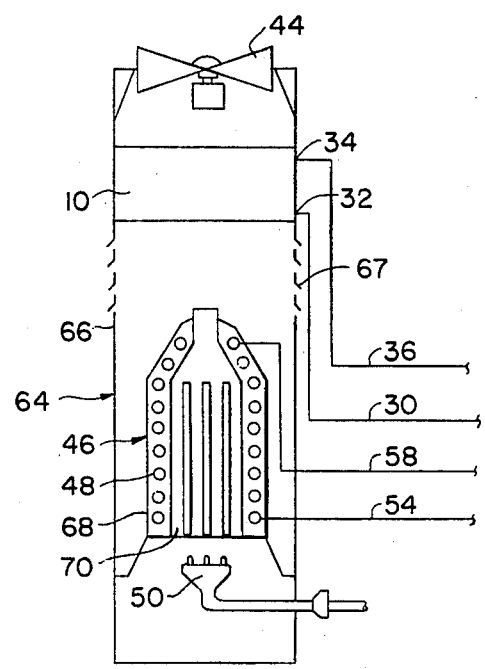
FIG.—2.

FUEL FIRED SUPPLEMENTARY HEATER FOR HEAT PUMP

This is a division of application Ser. No. 769,830, filed Feb. 18, 1977, now U.S. Pat. No. 4,112,705.

BACKGROUND OF THE INVENTION

Heat pumps are a device for the heating and cooling of an indoor space during winter and summer months, respectively. Generally speaking, heat pumps have a compressor and two heat exchange coils coupled with the compressor via suitable valving. One of the coils is indoors and the other is outdoors. During summer cooling of the indoor space, the indoor coil is operated as an evaporator for liquid refrigerant while the outdoor coil is operated as a condenser for refrigerant vapors. For heating the space during winter months, the indoor coil is operated as a condenser and the outdoor coil is operated as an evaporator.

In temperate climate zones, the winter heating load is usually greater than the summer cooling load. In order to effect the desired heating of the indoor space the compressor of the heat pump must be a relatively large, high horsepower compressor fitted to the heating demand or a supplementary heating system must be provided. To avoid the necessity for large and expensive high horsepower compressors, supplementary heating systems have heretofore been used.

Normally, electric resistance heaters built into in indoor (winter time) condenser were employed as supplementary heat sources. The resistance heater was operated whenever additional heat was required due to low outdoor temperatures. Up to now, such a construction has generally been satisfactory. However, with increasing energy costs and in particular with the prospect of having to pay peak demand penalties for electric energy, such resistance heaters are likely to become economically unfeasible, particularly since such heaters have an essentially zero diversity factor, that is they cannot be turned off during peak electricity demand times, (e.g. during the evening hours) and turned on during low demand times (e.g. during night time).

The alternative of using fuel, e.g. fossil fuel fired supplementary heaters is not readily realized because it is virtually impossible to obtain soot-free combustion, particularly with compact, high heat release burners such as would be required for incorporation in the indoor condenser of the heat pump. To insure a clean indoor atmosphere, it would therefore be mandatory that the combustion gases of the supplementary fuel fired heater be exhausted to the outdoor atmosphere. When so constructed, however, there is insufficient space for incorporating the supplementary heater in the condenser, particularly in a manner which would not interfere with the normal operation of the heat pump in general and the condenser in particular. To install the auxiliary fuel fired heater externally, however, sets it apart from the heat pump, requires separate controls, ducting, etc. and renders the installation as well as the operation and maintenance of the supplementary heater expensive, wasteful of space and therefore undesirable.

SUMMARY OF THE INVENTION

The present invention is specifically directed to providing a heat pump with an auxiliary fuel fired heater which is tied into the heat pump system and which can be installed with simple refrigerant piping. The auxiliary heater of the present invention can be constructed for operation with whatever fuel is available and/or least expensive. The heater per se is installed outdoors and can be employed to facilitate various other aspects of the operation of a heat pump as is more fully described below.

Generally speaking, a heat pump fitted with an auxiliary heater constructed in accordance with the present invention comprises a compressor unit, an indoor coil operated as a condenser for heating of an indoor space, an outdoor coil operated as an evaporator when the space is to be heated, and suitable conduits for flowing a refrigerant between the compressor and the coils. The auxiliary heater has a vaporizer for liquid refrigerant that is supplied to the vaporizer via a liquid metering pump from the outlet side of the condenser. Refrigerant vapor formed in the vaporizer is flowed via suitable piping to the intake side of the condenser. In this manner, the firing of the burner furnishes additional heated refrigerant vapor that is condensed in the condenser to release the desired heat energy to the indoor space to be heated.

The vaporizer may be a simple heat exchanger coil positioned downstream of the burner so that hot gases from the burner can heat the coil and vaporize the liquid refrigerant. Alternatively, the coil may be placed within a vessel such as a conventional household hot water heater to transfer the heat from the burner to the vaporizer via a suitable heat transfer medium such as water or, for installation of the vaporizer outdoors, an antifreeze such as ethylene glycol.

In addition to providing supplementary heat the refrigerant vaporizer of the present invention can also be employed for defrosting the outdoor evaporator. For that purpose, suitable valving is provided so that heated refrigerant vapor can be flowed through the coils of the evaporator, thereby raising the temperature of the coils and melting ice that has built up thereon.

In a presently preferred embodiment of the invention, the burner is a liquid petroleum gas (LPG) premix burner in which about 40-60% of the necessary combustion air is premixed with the fuel prior to the ignition thereof. This improves the efficiency of the burner. Moreover, the vaporizer of the present invention is preferably installed within the outdoor evaporator so that heat released by the vaporizer can be employed to aid the evaporation process. In addition, by incorporating the vaporizer of the present invention in the outdoor evaporator, the draft fan employed on the evaporator can be employed for inducing the necessary draft for the burner. Alternatively, the vaporizer of the present invention can be installed separately of the heat pump evaporator and the hot gas effluent pipe can be tied into the draft fan for the evaporator or a separate blower for the burner can be installed in the vaporizer.

From the preceding it is apparent that the present invention both facilitates the operation of heat pumps and renders the provision of supplementary heaters for the heat pump economically more attractive by employing readily stored and instantaneously available fuels such as LPG, gasoline, methanol, kerosene, heating oil, and the like. The unit is installed outdoors and does not occupy valuable indoor space. Furthermore, the outdoor installation of the auxiliary heater does not contaminate the indoor atmosphere; yet, the auxiliary heater of the present invention requires little in terms of additional components other than a low cost secondary refrigerant loop between the vaporizer and the condenser which bypasses the compressor of the heat pump. Thus, it does not unduly increase the initial cost of a heat pump.

BRIEF DESCRIPTION OF THE DRAWINGS

FIG. 1 is a schematic diagram illustrating a heat pump provided with an auxiliary, fuel fired heater constructed in accordance with the present invention;

FIG. 2 is a fragmentary schematic diagram similar to that of FIG. 1 but illustrates an alternative installation of the liquid refrigerant vaporizer of the present invention in conjunction with the evaporator of the heat pump.

DESCRIPTION OF THE PREFERRED EMBODIMENTS

Referring to FIG. 1, a heat pump 2 is schematically illustrated and comprises a compressor 4, an indoor fan coil 6 disposed within a building 8, an outdoor fan coil 10 and piping for flowing a suitable refrigerant between the compressor and the coil as is more fully described below. For purposes of the present invention the heat pump is illustrated as it operates to heat an indoor space 12 within the building. In this mode, the indoor coil operates as a condenser and the outdoor coil operates as an evaporator for the refrigerant.

Turning now more specifically to the operation and piping of the heat pump, a high pressure side 14 of the compressor communicates with an intake side 16 of the indoor coil 6 (hereinafter condenser) via a high pressure pipe 18. An outlet side 20 of the condenser communicates with a liquid refrigerant pipe 22 that leads to a liquid coil 23 in an accumulator 24 via a check valve manifold 26 set so that liquid refrigerant flows from the condenser to the accumulator coil. From the accumulator coil the liquid refrigerant is withdrawn and flows via an expansion valve 28, check valve manifold 26 and a supply pipe 30 to an intake side 32 of outdoor coil 10 (hereinafter evaporator). In the evaporator, the liquid refrigerant is evaporated by supplying it with heat from the ambient air and evaporated refrigerant flows from evaporator outlet 34 via a pipe 36 to the upper portion of accumulator 24. Evaporated refrigerant is fed from the accumulator to a compressor suction side 38 via a supply pipe 40.

The condenser is provided with a conventional blower 42 for inducing a flow of indoor air past the condenser to transmit to such air heat released during the condensation of high pressure and temperature refrigerant supplied by the compressor. Similarly, a draw-through fan 44 is mounted on top of evaporator 10 and is coupled therewith via a duct 45 (schematically illustrated in the drawing) to induce an airflow past the evaporator and thereby supply the evaporator with the necessary heat to evaporate liquid refrigerant fed to it via pipe 30.

The operation of the heat pump for heating indoor space 12 should now be apparent. The compressor is activated to compress and heat refrigerant vapors withdrawn from accumulator 24. The high pressure, heated refrigerant vapor is flowed to condenser 6 where it is condensed, thereby releasing heat energy which in turn is transmitted to the indoor space via air circulated through the condenser by blower 42. The liquid refrigerant withdrawn from the condenser is circulated through the accumulator coil 32, expansion valve 28 and pipe 30 to the outdoor evaporator from which refrigerant vapor is withdrawn and returned to the top of the accumulator. Operation of the heat pump as an indoor cooler during summer time is accomplished by turning a 4-way valve 47 to thereby reverse the refrigerant flow and utilizing the indoor coil 6 as an evaporator while the outdoor coil 10 is used as the condenser. Since the operation of the heat pump in this mode does not relate to the present invention, it is not further described herein.

To supply additional heat to condenser 6 the present invention provides a liquid refrigerant vaporizer 46 which generally comprises a vaporization coil 48 and a fuel burner 50 for heating the coil. The burner is a premix burner supplied with a suitable fuel such as LPG, for example, via a solenoid controlled fuel supply valve 52. The vaporization coil receives liquid refrigerant from a supply tube 54 that ties into the liquid line 22 from condenser 6. A hermetic liquid metering pump 56 is installed in the supply line to control the flow of liquid refrigerant to the vaporization coil. Liquid refrigerant vaporized in the vaporizer is discharged to a vapor line 58 that ties into the high pressure line 18 from compressor 4 to condenser 6.

When additional heat energy is required in indoor space 12, burner 50 is fired, preferably via an electric ignitor (not separately shown) or the like and metering pump 56 is activated to flow liquid refrigerant through the vaporizer. The heated refrigerant vapor formed in the vaporizer is supplied to the condenser where it is condensed to release the desired additional heat.

To assure that the vaporizer coil cannot be locally overheated (productive of refrigerant decomposition), it is preferred that the metering pump is selected so that it supplies liquid refrigerant at a rate greater than the rate at which the refrigerant is evaporated. In that manner, a wet refrigerant vapor is formed and supplied to the condenser. It is presently preferred that the metering pump supplies a quantity of liquid refrigerant which exceeds the evaporation capacity of the burner and the vaporizer by from 10–50% and preferably by about 30%. In addition, the metering pump is selected so that it supplies liquid at a rate which is from about 20–60% and preferably about 50% greater than the refrigerant flow in the heat pump per se during normal winter day operation thereof. In this manner, the compressor can be selected to effect the desired cooling of the indoor space during normal summer time temperatures in temperate climatic zones while the auxiliary heater can supply the necessary additional heat that is normally required in temperate zones to effect the desired winter time heating.

To induce the desired draft through vaporizer 48 a blower (not shown) or a suction fan 60 may be provided. Alternatively, the exhaust end of the vaporizer may be tied in with duct 45 of the evaporator via a suitably arranged conduit 62 shown in phantom lines in FIG. 1.

Referring now to FIG. 2, in an alternative embodiment of the invention, vaporizer 46 is installed within an outdoor evaporator unit 64, that is within duct 66 so that the draw-through fan 44 of the evaporator unit also induces the required draft through the vaporizer. Inlet louvres 67 may be provided upstream of coil 10 to provide a coil air flow that bypasses the vaporizer.

FIG. 2 also shows an alternate construction of the vaporizer itself. The vaporization coil 48 is placed within a conventional domestic hot water heater 68 having the conventional, vertically arranged flues 70, while the vaporization coil 48 is disposed inside the vessel defined by the heater. The interior of the vessel is filled with a suitable heat exchange medium, normally an anti-freeze such as ethylene glycol to prevent freezing and possible damage to the heater and/or the coil therein. This construction of the vaporizer has the advantage that direct contact between the hot gases from the burner and the coil and a resulting possible local overheating of the coil is prevented. Instead, the coil is evenly heated by the liquid within the vessel.

Of course, the hot water heater 68 may be an electric water heater, preferably an enlarged, off-peak type heater to reduce energy costs. Such a water heater can then function as a hot water supply for the house in which the heat pump is installed as well as a supply of heat during times when the pump requires additional heat as above described.

Referring again to FIG. 1, vaporizer 46 of the present invention can be employed to rapidly defrost the outdoor evaporator 10. For that purpose, a first check valve 72 is installed in the high pressure line 18 from compressor 4. Further, a bypass line 74 from the bottom of accumulator 24 to the suction side of metering pump 56 in liquid refrigerant supply pipe 54 is provided. The bypass line includes a check valve 76 that prevents the backflow of liquid refrigerant from the supply line 54 to the interior of the accumulator.

To defrost evaporator 10 with the vaporizer 46 of the present invention, compressor 4 and outdoor fan 44 are shut down. Four-way valve 47 is turned so that it connects hot vapor line 58 from the vaporizer with vapor line 36 from evaporator 12 as is shown in phantom lines.

Burner 50 is now ignited and metering pump 56 is activated to flow liquid refrigerant through the vaporizer. The resulting vapor is flowed via pipe 58, 4-way valve 47 and pipe 36 to the top of evaporator 10 where the temperature of the evaporator is raised to melt frost that has built up on the exterior of the evaporator. Liquid refrigerant circulated through the evaporator is returned to the suction side of the metering pump via pipe 30 and check valve manifold 26. In this manner, the defrosting cycle, which normally takes considerable time, particularly at relatively low outside temperatures, can be accomplished rapidly. Moreover, the violent flow and pressure transients associated with the conventional reversed cycle defrosting are eliminated to thereby enhance compressor reliability.

After completion of the defrost cycle the burner and metering pumps are turned off, the 4-way valve 47 is returned to its heating position (shown in FIG. 1 in solid lines) and the compressor 4 and outdoor fan 44 are activated to continue operation of the heat pump in its indoor heating mode. If auxiliary heat is required, burner 50 is, of course, turned on again to function as described earlier.

I claim:

1. A method for supplying a heat pump with additional, auxiliary heat during operation of the pump for heating an indoor space while the outdoor temperature is too low to heat the space to the desired temperature, the heat pump including a compressor, an indoor condenser, an outdoor evaporator, and piping for flowing a refrigerant between the compressor, the condenser, and the evaporator, the method comprising the steps of: operating the compressor to flow high pressure, high temperature refrigerant vapor to the condenser; condensing the high pressure, high temperature vapor in the condensor to form liquid refrigerant; forming a first refrigerant flow by circulating the liquid refrigerant to the evaporator and hence circulating evaporated refrigerant back to the compressor; forming a second refrigerant flow bypassing the compressor by taking a portion of the liquid refrigerant from the condenser, heating the liquid refrigerant in the second flow, controlling the flow rate of the second refrigerant flow so that it exceeds the rate at which the refrigerant of the second flow is evaporated during the heating step to thereby maintain the refrigerant vapor in its wet state and prevent a decomposition of the refrigerant due to overheating, and flowing the heated refrigerant of the second flow back to the condenser; and releasing heat from the heated refrigerant of the second flow in the condenser to thereby heat the space to the desired temperature.

2. A method according to claim 1 wherein the quantity of the liquid refrigerant in the second refrigerant flow exceeds the amount of liquid refrigerant evaporated in said second refrigerant flow by about 10–50%.

3. A method according to claim 2 wherein the quantity exceeds the amount by approximately 30%.

4. A method according to claim 1 wherein the quantity of the refrigerant in the second refrigerant flow exceeds the quantity of the refrigerant in the first refrigerant flow by about 20–60%.

* * * * *